May 14, 1968     J. HALLER     3,383,146
ROLLER BEARING ASSEMBLY
Filed Aug. 18, 1965
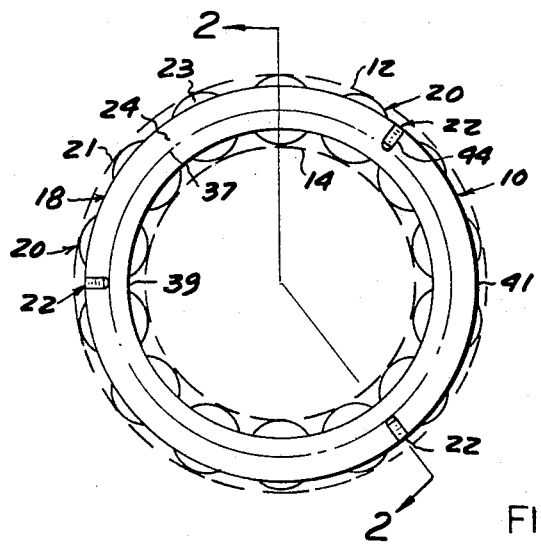
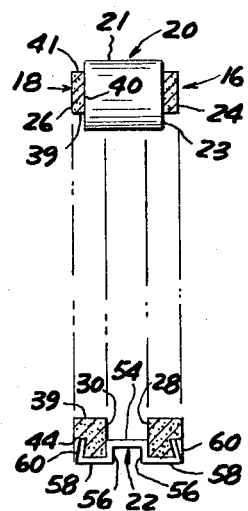
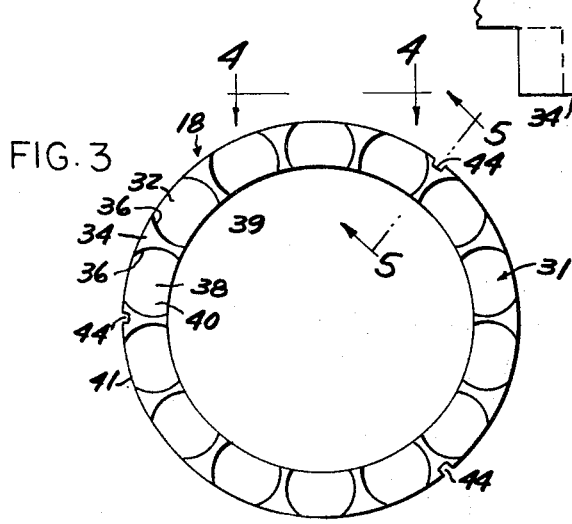
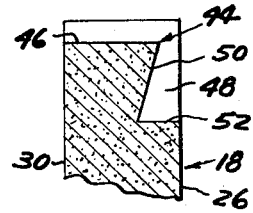
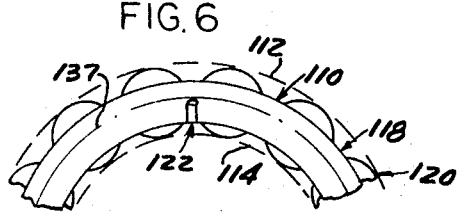
INVENTOR
JOHN HALLER
BY Barthel & Bugbee
ATTORNEYS

United States Patent Office

3,383,146
Patented May 14, 1968

3,383,146
ROLLER BEARING ASSEMBLY
John Haller, Northville, Mich., assignor to Federal-Mogul Corporation, Detroit, Mich., a corporation of Michigan
Filed Aug. 18, 1965, Ser. No. 480,643
3 Claims. (Cl. 308—217)

ABSTRACT OF THE DISCLOSURE

This roller bearing assembly has annular retainers of molded sintered powdered material, such as metal or synthetic plastic, which are provided on their inner faces with circumferentially-spaced recesses rotatably receiving the opposite ends of the bearing rollers. These recesses having generally cylindrical side walls which are preferably cut away marginally to provide peripheral openings through which the rollers project, the retainers and rollers being held together by circumferentially-spaced spring clips seated in peripheral recesses in the retainers and having inwardly-offset intermediate spacing portions interposed between the facing surfaces of the retainers.

ADVANTAGES OF THE INVENTION

This invention as above constructed has the following advantages:

(1) The same recessed roller retainers can be used with different lengths of rollers to form roller bearing assemblies of different axial lengths, thereby reducing the number and variety of parts hitherto required to be produced and kept in stock;

(2) The opposite annular roller retainers can be formed from different types and compositions of powdered material according to the type of service which the bearing is to be called upon to perform, yet employ the same molding dies for such differing types;

(3) The opposite annular roller retainers of a given bearing assembly can move circumferentially an infinitesimal amount relatively to one another by reason of the slight clearances between the spring clips and their recesses, thereby enabling the bearing rollers to self-align themselves relatively to their respective recesses in the opposite roller retainers and thus reduce friction and consequent wear resulting in previously misaligned roller bearing assemblies of conventional construction.

(4) The previous necessity of forming indentations in the opposite ends of conventional bearing rollers and pivotal projections in conventional annular roller retainers is eliminated, yet at the same time ease and rapidity of assembly is provided with a minimum of expensive hand assembly operations;

(5) This construction can be employed with bearing assemblies having bearing rollers rolling either upon a grooved-path external or internal race, simply by locating the spring clip recesses and spring clip upon either the inner or outer edges respectively of the annular roller retainers;

(6) The recessed sintered powdered material retainers, because of their porosity, can be impregnated with a lubricant so as to render the composite roller bearing assembly self-lubricating throughout its normal life;

(7) The elimination of the spacing rods previously required in conventional roller bearing assemblies enables a greater number of rollers to be mounted in a bearing assembly of a given diameter by the addition of the space previously occupied by such spacing rods, with a corresponding increase in the load-bearing capacity of the bearing assembly.

In the accompanying drawing:

FIGURE 1 is a side elevation of a roller bearing assembly, according to one form of the invention, arranged for the bearing rollers to project a greater distance inward than outward in order to roll in an annularly-grooved inner race, with consequently greater space provided for retaining clips mounted on the outer periphery, and with roller paths indicated by dotted lines, the conventional outer and inner races being omitted for simplicity of disclosure;

FIGURE 2 is a cross section taken along the broken line 2—2 in FIGURE 1;

FIGURE 3 is a side elevation of one of the recessed annular retainers of the bearing assembly of FIGURES 1 and 2, looking toward the recessed inner face thereof;

FIGURE 4 is an enlarged fragmentary top plan view of a portion of the annular retainer shown in FIGURE 3, looking in the direction of the arrows 4—4 therein;

FIGURE 5 is an enlarged fragmentary cross-section through one of the partition walls between adjacent bearing end recesses of the annular retainer shown in FIGURE 3, taken along the line 5—5 therein and showing the notch for receiving one end of one of the spring clips; and FIGURE 6 is a fragmentary side elevation, similar to FIGURE 1, but arranged for the bearing rollers to project outward a greater distance than inward in order to roll in an annularly-grooved outer race, with consequently greater space provided for retaining clips mounted on the inner periphery, and with the outer and inner races also omitted for simplicity of disclosure.

Referring to the drawing in detail, FIGURE 1 shows a roller bearing assembly, generaly designated 10, according to one form of the invention with the conventional outer and inner races omitted but with their annular surfaces constituting their roller paths indicated by the circles 12 and 14 respectively. The roller bearing assembly 10 includes a pair of annular bearing roller retainers 16 and 18 respectively disposed coaxial and in spaced parallel relationship. The retainers 16 and 18 are of similar construction except that they are so-called mirror opposite in that they are of right-hand and left-hand arrangement as appears more fully below. Arranged between and rollably supported by the annular roller retainers 16 and 18 are bearing rollers 20, preferably of solid steel and having cylindrical outer surfaces 21 and flat plain opposite ends 23.

Also mounted at circumferentially-spaced locations around the peripheries of the annular retainers 16 and 18, which are recessed radially to receive them, are approximately W-shaped retainer holders in the form of spring clips 22. Three such spring clips are shown in FIGURE 1, but for heavy duty bearings a greater number may be employed. Where, as in the roller bearing assembly 10 of FIGURES 1 to 5 inclusive, the bearing rollers 20 roll upon the inner roller path 14 constituting the bottom surface of the annular roller groove in a conventional race (not shown), the retainer holders or spring clips 22 are mounted upon the outer periphery 41 of the rollers retainers 16 and 18.

Each of the right-hand and left-hand annular roller retainers 16 and 18 has a plain outer face 24 or 26 and a recessed inner face 28 or 30 respectively. Each of the recessed inner faces 28 and 30 is provided with an annular set 31 of circumferentially-spaced roller end recesses or seats 32 of incompletely cylindrical or cut-away cylindrical shape with interrupted side surfaces or arcuate shoulders 36 corresponding in diameter, with the necessary clearances, to the diameter of the cylindrical surfaces 21 of the rollers 20 and constituting the arcuate opposite sides of partition walls 34 of capstan-shaped cross-section. The circle 37 on which the centers 38 of the bearing end recesses or seats 32 are located in FIGURE 1 to 5 inclusive, is disposed nearer the inner periphery or edge 39 so as to cause the rollers 20 to project to their maximum extent beyond that edge.

Formed in each of the annular retainers 16 and 18 at equally-spaced circumferential intervals therearound are approximately L-shaped clip recesses or notches 44 (FIGURE 5) having axial or longitudinal groove portions 46 and undercut radial indentations 48, the latter having obliquely-inwardly inclined bottom walls 50 and axially-directed end walls 52. The recesses 44 for the right-hand retainer 16 are the same but extend in the opposite direction.

Each spring clip 22 (FIGURE 2) includes a central axial portion 54 and two radial portions 56 which determine the axial spacing of the inner surfaces 28 and 30 of the right and left-hand retainers 16 and 18. The radial portions 56 continue in aligned axial portions 58, the outer ends of which terminate in oblique portions 60 inclined toward one another. The axial portions 58 fit into the axial grooves 46, the inclined portions 60 fit into the undercut radial indentations 48, and the portions 54 and 56 lie between the inner surfaces 28 and 30 of the right and left-hand retainers 16 and 18 as stated above.

The annular retainers 16 and 18 are formed by conventional pressing methods in conventional briquetting presses between dies of opposite configuration to the configurations of the retainers 16 and 18. The lower die preferably contains the die cavity for producing an upwardly-facing retainer 16 or 18, whereas the upper die constitutes the punch secured to the movable press platen and has individual circumferentially-spaced punch portions or projections for producing the roller end recesses 40. A powdered metal of suitable size and composition is placed in the die cavity while the press platen is in its raised position. The descent of the press platen and the punch attached to it compresses the powdered metal and forms it into a briquette or "green" pressing corresponding in shape to the annular retainer 16 or 18.

The platen and punch are then retracted upward and the briquette or pressing is then ejected, placed in a sintering oven and sintered according to procedures well known to those skilled in the art of powder metallurgy. The pressing pressures vary with the porosity or density desired. The powdered material employed may be powdered iron, powdered bronze, or may be a suitable powdered synthetic plastic, such as the polymeric amide plastic known commercially as "nylon." The sintered powdered metal retainers 16 and 18 may then, if desired, be impregnated with a suitable lubricant, such as lubricating oil, by conventional methods for example, by immersing them in a closed container of lubricant which is then evacuated to cause the lubricant to penetrate the pores of the sintered powdered metal retainers 16 or 18, as the case may be.

In the assembly of the roller bearing assembly 10, the inner race (not shown) containing the roller path 14 and one of the annular roller retainers 16 or 18 are placed in concentric relationship upon a horizontal support, such as a table or fixture, with the recesses 32 facing upward and with the selected retainer 16 or 18 concentric with the inner race. A suitable number of rollers 20 constituting a set are then pushed horizontally inward into the roller groove of the inner race until their ends 23 coincide with their respective recesses 32, whereupon they are dropped into the recesses 32 while their inner edge portions are within the roller groove of the inner race, the bottom are which constitutes the inner roller path 14. The other annular roller retainer 18 or 16 is then superimposed upon the free ends 23 of the upwardly-projecting rollers 20 so as to cause these free roller ends 23 to enter the aligned roller end recesses 32 therein. Assuming that the notches 44 have been aligned with one another at the same time in both retainers 16 and 18, the spring clips 22 are then pressed into these notches 44 and snapped into position. The conventional outer race (not shown) is then dropped over the outer edges of the rollers 20 with its inner annular surface occupying the position of the roller path 12, and the assembly is then ready for use as an anti-friction bearing unit.

The roller bearing assembly, generally designated 110, shown fragmentarily in FIGURE 6 is generally similar to the roller bearing assembly 10 of FIGURES 1 to 5 inclusive and similar parts are designated with similar reference numerals increased by 100. The rollers 120 of the roller bearing assembly 110, however, are intended to roll in a roller path 14 constituting the bottom of an annular groove in the outer race, hence the rollers 120 are caused to project farther outward from the outer periphery 141 than inward from the inner periphery 139 by placing the centers 138 of the bearing end recesses 140 closer to the outer periphery 141 than to the inner periphery 139. This thus reverses the arrangement of the roller bearing assembly 10 of FIGURES 1 to 5 inclusive. The construction of FIGURES 1 to 5 inclusive enables the inner periphery 39 to clear the annularly-grooved inner race containing the roller path 16, while at the same time producing wider spaces for the clips 22 on the outer periphery 41, whereas the construction of FIGURE 6 enables the outer periphery 141 to similarly clear the annularly-grooved outer race containing the roller path 114 while at the same time providing wider spaces for the clips 122 on the inner periphery 139.

The assembly of the roller bearing assembly 110 follows a similar procedure to that previously described for the roller bearing assembly 10, with the exception that the annularly-grooved outer race is placed in concentric relationship with the selected annular roller retainer 16 or 18 and the set of rollers 20 pushed horizontally outward into the roller groove of the outer race until their ends 23 again coincide with their respective recesses 32 and their outer edge portions engage the bottom of the roller groove in the outer race indicated by the outer roller path 12. The spring clips 122 are then pressed into the notches 144 in the inner peripheries 139 of the roller retainers 16 and 18 and snapped into position. The conventional inner race (not shown) is then dropped into the central space with its outer annular surface occupying the position of the roller path 14, and the assembly is then ready for use as an anti-friction bearing unit.

What I claim is:

1. A roller bearing assembly, comprising a pair of annular roller retainers of sintered powdered material disposed coaxial with one another and having outer and inner peripheries and having facing surfaces disposed in axially-spaced parallel relationship, the facing surface of each retainer having therein a set of bearing roller and recesses of incompletely cylindrical configuration with side walls of generally circular cross-section disposed in circumferentially-spaced relationship with their centers disposed on a circle coaxial with said retainers, bearing rollers mounted between said retainers with their opposite end portions rotatably mounted in said recesses in mating bearing engagement with said side walls, and means engaging said retainers and extending therebetween for holding said retainers and said bearing rollers in assembly with one another, said side walls of said recesses being cut away marginally adjacent at least one of said peripheries to provide peripheral openings therethrough and marginal portions of said rollers projecting radially through said openings, said holding means including circumferentially-spaced notches formed in one edge of each retainer and also including spring clips resiliently engaging said notches and extending therebetween, each clip having a shouldered central portion interposed between said facing surfaces of said retainers in spacing relationship therewith.

2. A roller bearing assembly, according to claim 1, wherein said circle is disposed nearer the inner edge of each retainer, wherein said rollers project to their maximum extent beyond said inner edge and wherein said notches and said spring clips are disposed in the outer edge portions of said retainers.

3. A roller bearing assembly, according to claim 1, wherein said circle is disposed nearer the outer edge of each retainer, wherein said rollers project to their maximum extent beyond said outer edge and wherein said notches and said spring clips are disposed in the inner edge portions of said retainers.

References Cited

UNITED STATES PATENTS

| 502,025 | 7/1893 | Avery | 308—217 |
|---|---|---|---|
| 627,551 | 6/1899 | Vidlund | 308—217 |
| 1,045,193 | 11/1912 | Sachs | 308—201 |
| 1,609,618 | 7/1925 | Gallagher et al. | 308—217 |
| 1,614,823 | 1/1927 | Bukolt | 308—217 |
| 2,122,365 | 6/1938 | Beck | 308—201 |
| 2,569,531 | 10/1951 | Kunzog. | |

FOREIGN PATENTS 25,324  2/1907  Sweden.

MARTIN P. SCHWADRON, *Primary Examiner.*

FRANK SUSKO, *Examiner.*